Dec. 8, 1936. D. SWAROVSKI Re. 20,193

ARTICLES OF JEWELRY AND ORNAMENTS

Original Filed April 6, 1932 2 Sheets-Sheet 1

Inventor:
Daniel Swarovski
by Thurlow Ackerman
Atty.

Dec. 8, 1936. D. SWAROVSKI Re. 20,193

ARTICLES OF JEWELRY AND ORNAMENTS

Original Filed April 6, 1932 2 Sheets-Sheet 2

Inventor
Daniel Swarovski
by Mueseuallemar Atty.

Reissued Dec. 8, 1936

Re. 20,193

UNITED STATES PATENT OFFICE 20,193

ARTICLES OF JEWELRY AND ORNAMENTS

Daniel Swarovski, Wattens, Tyrol, Austria

Original No. 1,997,500, dated April 9, 1935, Serial No. 603,639, April 6, 1932. In Austria June 9, 1931. Application for reissue December 23, 1935, Serial No. 55,918

18 Claims. (Cl. 18—59)

The invention relates to new articles of jewelry or ornaments and the like including stones, jewels, beads or the like and in the specification and claims these terms are used interchangeably and to mean the same thing of whatever material they may be made.

This invention relates to a new and improved method of manufacturing new articles of jewelry and ornaments consisting essentially of stones or paste embedded in a foundation made of plastic substances.

It has been the practice in the manufacturing of such articles of jewelry and ornaments from imitation diamonds or paste either to fasten these stones in shells of metal or glass, or to mount the same in settings by the rolling of the edges of the latter or by the bending over of projections provided for the purpose, or to stick or cement these stones in depressions. With the first mentioned method of mounting, the stones are apt to become damaged, while the sticking or cementing of the stones in depressions has the disadvantage that the stones are held in place merely by the adhesive power of the sticking substance or cement used and can therefore easily break loose. Common to all these methods is the further disadvantage of comparatively high cost of production, since several consecutive time-consuming operations or processes are necessary.

In accordance with the present invention the above-mentioned drawbacks are obviated by arranging that simultaneously with the shaping of the ornament by the pouring or pressing of the foundation substance into a suitable mould the stones themselves are mounted or fixed in position and, if desired, the clasp or other means of attachment is also secured in position on the ornament.

The carrying out of the invention and some of the new articles are illustrated with the aid of a number of examples in the accompanying drawings, in which:—

Figure 1:
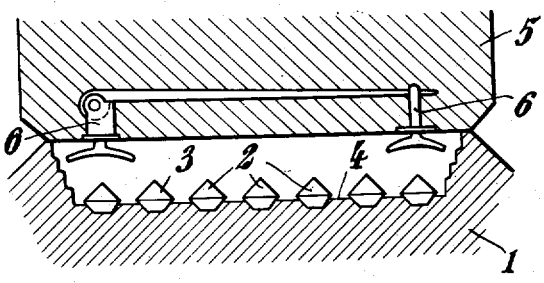
Figs. 1 and 2 show the parts of the pressing or casting mould, in two different variations, in section.
Figure 3:
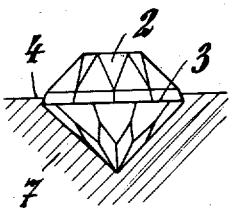
Figs. 3 and 4 show a stone with its setting taken from each of the ornaments made in the moulds shown in Figs. 1 and 2 respectively.

Referring to Fig. 1, there are provided in the lower portion 1 of the matrix, which corresponds to the desired shape of the finished ornament, according to the intended arrangement of the stones, depressions each of which is adapted to receive a stone. The stones 2 are placed with their outer faces downwards in these depressions, and these depressions and the stones are so dimensioned that the edge 3 at which the stone is largest in diameter assumes a position above the edge 4 of the depressions in the mould. In the upper part 5 of the matrix the clasp or fastening set 6 is so inserted that the portions thereof to be embedded in the plastic foundation material project into the hollow space within the mould. The plastic substance used, such as, for example, celluloid or the like, rubber, synthetic resin, or artificial horn, is then pressed or poured into the closed mould in the cold or in the hot state. In this manner the shaping of the ornament, the mounting of the stones, and the fixing in position of the fastening set are all effected simultaneously in a single working process. The plastic substance 7 adapts itself uniformly to the shape of the surface of the stones (see Fig. 3) and overlaps their edge 3, without in any way damaging the stones or shifting the same from their respective positions. The pressed or cast articles are removed from the mould after hardening, and are then completely finished, except for any slight touching up which may possibly be necessary.

Figure 2:
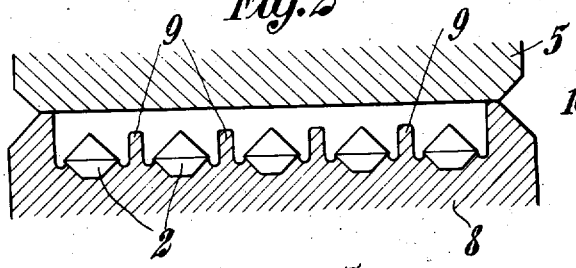
Figure 4:
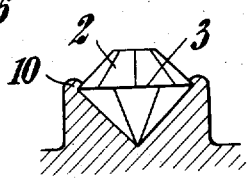

The form shown in Fig. 2 is modified to the extent that the lower portion 8 of the matrix is provided with prominences 9 which enclose hollows which are coaxial with the stones, and which are filled out by the plastic material when the mould is closed. The setting of the stones then appears in relief on the surface of the foundation material (see Fig. 4). The edge 3 of the stones is in this case enclosed in an annular bead 10 of the foundation material.

Figure 5:
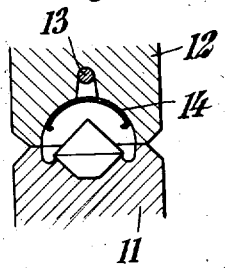
Fig. 5 shows a type of mould used in manufacturing buttons in accordance with the present invention.

For the manufacturing of a button a mould of the type shown in Fig. 5 is employed. The shape of the lower portion 11 of the matrix 11 is similar to that of the corresponding lower portion of the matrix 8 in Fig. 2. In the bell-shaped hollowed upper portion 12 there is inserted the fastener for the button. This fastener consists of an eye 13 and of a curved member 14 which lies close against the arched inner surface of the upper part of the mould, the ends of this member being bent inwards to form hooks which become anchored in the foundation substance.

Figure 6:
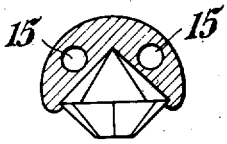
Fig. 6 shows a finished button, in a modified form.

The button shown in Fig. 6 is manufactured in a very similar manner. With a view to being sewn on to fabrics this button is provided with two holes 15 which are formed by means of die slidably arranged in the upper portion of the matrix, this die being inserted into the hollow of the mould before casting and subsequently withdrawn therefrom. This die thus constitute the negative of the fastener for the button.

Figure 7:
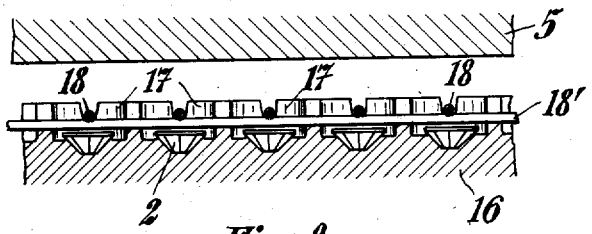
Fig. 7 shows a type of mould for the manufacturing of an ornament consisting of stones held together by a network.
Figure 8:
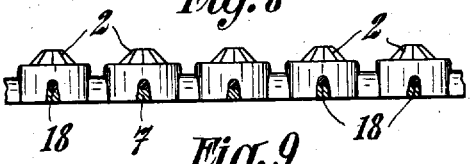
Figs. 8 and 9 show the finished product obtained with the use of the mould shown in Fig. 7, in side elevation and plan, respectively.
Figure 9:
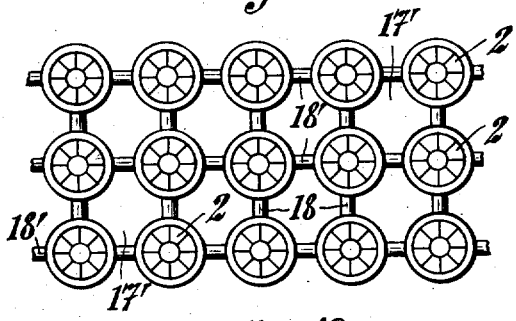

For the manufacturing of groups and sets of stones in rows held together by a network of threads or fine wires the mould shown in Fig. 7 is employed. The lower portion 16 of the matrix accommodates the stones in a manner similar to that shown in Fig. 2 and is provided with prominences 17 the shape of which in plan corresponds to the intermediate spaces 17′ between the individual stone settings (see Fig. 9). Between these prominences there are left grooves in which the threads 18, 18′ are placed. After the mould has been filled out with the plastic foundation material the flat pressing die 5, which is shown in the drawings in the lifted-off position, is pressed upon the mould, thus forming a meshed strip of stones in settings held together by threads (see Fig. 8). The threads or wires are deeply embedded in the foundation substance 7, with the result that the finished strip acquires a certain degree of stiffness or rigidity which renders the same particularly suitable for attachment to plane surfaces.

Figure 10:
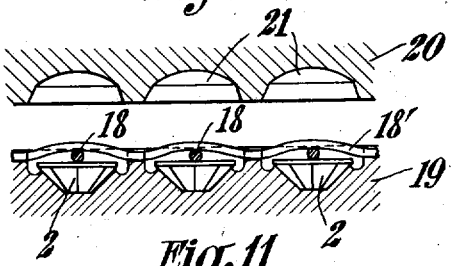
Fig. 10 shows a modified form of the last-shown type of mould.
Figure 11:
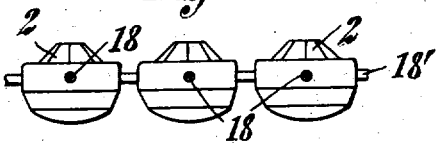
Fig. 11 is a view in elevation of a row of stones mounted in this type of mould.

Yielding or supple strips of this type, such as are required more particularly for sewing on to fabrics, are manufactured by means of the mould shown in Fig. 10. This mould is distinguished from the previously described mould by the fact that the lower portion 19 of the matrix is made very shallow, while the upper portion 20 is provided with arched hollows or recesses 21 for the reception of the plastic foundation material which, during the casting process, surrounds threads 18, 18′ laid crosswise over the stones in shallow grooves but leaves the cords between the stones free of plastic (see Fig. 11).

Figure 12:
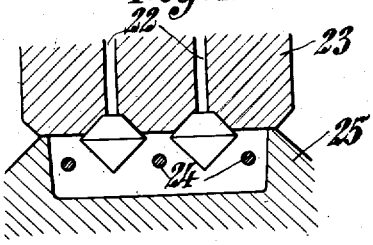
Fig. 12 illustrates, with the aid of a sectional view of a mould, a modification in the carrying out of the method according to the invention.

Under certain circumstances it can be advisable to arrange the stones in the upper portion of the matrix. In this case there are provided in the upper portion 23 of the mould channels 22 which issue in the cavities provided for the reception of the stones, and which are connected to any desired suction pipe line which is not shown in the drawings (Fig. 12). In the lower portion of the mould there is placed the reinforcement which, in the present instance consists of wires 24. After the filling of the lower portion 25 with the plastic foundation material the upper portion is placed in position, thus pressing the stones, which have been kept in place by suction, into the plastic material to a depth to cover their largest diameter.

The decorative effect of articles of ornamentation and jewelry thus manufactured can be increased by the employment of tinted foundation materials, or by subsequently colouring or metallically coating the surface of the foundation. It will also be clear that the various modifications of the method described can be combined, so that, for example, articles made by the method illustrated in Fig. 12 are provided with fastening means of the type shown in Fig. 6, and so forth.

I claim:—

1. The method of forming ornamental articles which consists in providing a stone with a crown portion and a belt at the major base of the crown constituting that portion of the stone having the maximum cross section, supporting said stone in a mold part with the crown vertically embedded in said mold part and the belt spaced from the surface of said mold part, and forcing plastic material around the exposed part of the stone to engage over the belt and against the exposed part of the crown.

2. The method of forming ornamental articles which consists in providing a series of stones each with a crown portion and a belt at the major base of the crown constituting that portion of the stone having the maximum cross section, supporting said stones in spaced relation in a mold part with the crown of each partially embedded in said mold part and the belt of each spaced from the surface of said mold part, forcing a continuous mass of plastic material around all the exposed portions of said stones to engage over their belts and against the exposed portions of their crowns, and simultaneously weakening the plastic material between adjacent stones.

3. The method of forming ornamental articles which consists in providing a series of stones each with a crown portion and a belt at the major base of the crown constituting that portion of the stone having the maximum cross section, supporting said stones in spaced relation in a mold part with the crown of each partially embedded in said mold part and the belt of each spaced from the surface of said mold part, arranging flexible strands across said stones in spaced relation to the surface of said mold part, forcing a continuous mass of plastic material around said strands and all the exposed portions of said stones to engage over their belts and against the exposed portions of the crowns, and simultaneously weakening the plastic material between adjacent stones.

4. The method of forming ornamental articles which consists in providing a jewel stone with a crown portion and a belt at the major base of the crown constituting that portion of the stone having the maximum cross section, supporting said stone in a mold part with the crown vertically embedded in said mold part and the belt spaced from the surface of said mold part, and forcing celluloid-like plastic material around the exposed part of the stone to engage over the belt and against the exposed part of the crown.

5. The method of forming ornamental articles which consists in providing a series of jewel stones each with a crown portion and a belt at the major base of the crown constituting that portion of the stone having the maximum cross section, supporting said stones in spaced relation in a mold part with the crown of each partially embedded in said mold part and the belt of each spaced from the surface of said mold part, forcing a continuous mass of celluloid-like plastic material around all the exposed portions of said stones to engage over their belts and against the exposed portions of their crowns, and simultaneously weakening the plastic material between adjacent stones.

6. A beaded fabric comprising a flexible foundation sheet, a plurality of glass beads thereon, said beads being substantially flat on one face and convex on the other, and a plastic adhesive securing said beads flat face down to said sheet, said adhesive extending beyond the outline of each of said beads and embracing the lower marginal edge thereof.

7. A jeweled fabric comprising a flexible foundation sheet, a plurality of jewels thereon, said jewels being substantially flat on one face and having an upwardly inclined marginal edge, and a plastic adhesive extending beyond the marginal edge of each of said jewels, said adhesive embracing the inclined marginal edge thereof.

8. The method of forming ornamental articles which consists in providing a stone with a crown portion and a belt at the major base of the crown constituting that portion of the stone having a maximum cross section, and forcing plastic material about the belt while leaving exposed a portion of the crown.

9. The method of forming ornamental articles which consists in providing a series of stones each with a crown portion and a belt at the major base of the crown constituting that portion of the stone having a maximum cross section, arranging flexible strands across the stones out of contact with the crowns, and forcing plastic material about the strands and the belts while leaving a portion of each crown exposed.

10. An ornamental article consisting of a series of stones each with a crown portion and a belt at the major base of the crown constituting that portion of the stone having a maximum cross section, flexible strands across the stones out of contact with the crowns, and plastic material surrounding the strands and the belts but leaving a portion of each crown exposed.

11. A beaded fabric comprising a flexible fabric, a plurality of beads thereon said beads being substantially convex on at least one side, and a plastic material securing said beads to the foundation with a convex side away from the foundation, said plastic extending beyond the outline of each bead and embracing the lower marginal edge thereof.

12. A beaded fabric comprising a flexible foundation, a plurality of beads thereon, said beads being substantially flat on one face and convex on the other, and a plastic adhesive connecting said beads flat-face down to the flexible foundation, the plastic extending beyond the outline of each of the beads and embracing the lower marginal edge thereof but leaving uncovered portions of the cords between beads.

13. A beaded fabric comprising a foundation layer of cords, a plurality of beads thereon said beads being substantially convex on at least one side, and a plastic material securing said beads to the foundation with a convex side away from the foundation, said plastic extending beyond the outline of each bead and embracing the lower marginal edge thereof but leaving uncovered portions of the cords between the beads.

14. The method of forming ornamental articles which consists in providing a stone with a crown portion and a belt at the major base of the crown constituting that portion of the stone having the maximum cross section, supporting said stone by its crown so as to leave exposed all of the stone except a part of the crown away from the belt and applying plastic material around the exposed part of the stone to engage over the belt.

15. A beaded fabric comprising a flexible foundation layer of material made of strands, a plurality of glass beads thereon, said beads being substantially flat on one face and convex on the other, and a plastic adhesive securing said beads flat face down to said layer, said adhesive extending beyond the outline of each of said beads and embracing the lower marginal edge thereof.

16. A jeweled fabric comprising a flexible foundation layer of material made of strands, a plurality of jewels thereon, said jewels being substantially flat on one face and having an upwardly inclined marginal edge, and a plastic adhesive extending beyond the marginal edge of each of said jewels, said adhesive embracing the inclined marginal edge thereof.

17. A method of forming a beaded fabric comprising a flexible foundation layer of material made of strands having a plurality of glass beads thereon, the beads being substantially flat on one face and convex on the other, said method comprising associating a flexible layer and the beads and the plastic so that the plastic embraces the layer and holds the beads in position with the flat faces of the beads toward the flexible layer and extends beyond the outline of each of the beads and embraces the lower marginal edge thereof.

18. A beaded fabric comprising a flexible foundation, a plurality of beads thereon each with a crown portion and a belt at the major base of the crown constituting that portion of the bead having a maximum cross section, and a plastic adhesive securing said beads to said foundation, said adhesive extending beyond the belt but leaving exposed a portion of the crown.

DANIEL SWAROVSKI.